US006699563B1

(12) United States Patent
Alhamad

(10) Patent No.: US 6,699,563 B1
(45) Date of Patent: *Mar. 2, 2004

(54) COMPOSITIONS OF MATTER FOR STOPPING FIRES, EXPLOSIONS AND OXIDATIONS OF MATERIALS AND BUILD UP OF ELECTROSTATIC CHARGES AND METHOD AND APPARATUS FOR MAKING SAME

(76) Inventor: Shaikh Ghaleb Mohammad Yassin Alhamad, P.O. Box 31590, Riyadh, 11418 (SA)

(*) Notice: Subject to any disclaimer, the term of this patent is extended or adjusted under 35 U.S.C. 154(b) by 0 days.

This patent is subject to a terminal disclaimer.

(21) Appl. No.: 10/280,988

(22) Filed: Oct. 24, 2002

Related U.S. Application Data

(60) Continuation of application No. 09/658,595, filed on Sep. 11, 2000, which is a continuation of application No. 08/561,293, filed on Nov. 21, 1995, now Pat. No. 6,117,062, which is a continuation of application No. 08/414,106, filed on Mar. 31, 1995, now abandoned, which is a continuation-in-part of application No. 07/806,901, filed on Dec. 12, 1991, now Pat. No. 5,402,852, which is a division of application No. 07/674,277, filed on Mar. 19, 1991, now Pat. No. 5,097,907, which is a division of application No. 07/417,696, filed on Oct. 5, 1989, now Pat. No. 5,001,017, which is a division of application No. 07/280,317, filed on Dec. 6, 1988, now abandoned.

(51) Int. Cl.[7] .......... B23M 3/24

(52) U.S. Cl. .......... 428/136; 428/131; 428/135; 169/45; 169/62; 169/66; 169/46; 169/49; 220/88.1

(58) Field of Search .......... 428/131, 135, 428/136; 169/45, 62, 66, 46, 49; 220/88.1

(56) References Cited

U.S. PATENT DOCUMENTS

| | | | | |
|---|---|---|---|---|
| 312,864 | A | 2/1885 | Kinney | 29/6.1 |
| 1,103,033 | A | 7/1914 | Clark | 29/6.1 |
| 1,671,650 | A | 5/1928 | Newman et al. | |
| 2,294,478 | A | 9/1942 | Norris et al. | 29/6.1 |
| 2,565,641 | A | 8/1951 | Zizka | 29/6.1 |
| 2,611,298 | A | 9/1952 | Rowe | 29/6.1 |
| 3,162,231 | A | 12/1964 | Emerson | 29/6.1 |
| 3,263,231 | A | 7/1966 | Smith et al. | 153/2 |
| 3,276,096 | A | 10/1966 | McAleer | 29/6.1 |
| 3,349,953 | A | 10/1967 | Conawy et al. | 220/85 |
| 3,356,256 | A | 12/1967 | Szego | 220/88 |
| 3,687,329 | A | 8/1972 | Baum | 220/26 R |
| 4,144,624 | A | 3/1979 | Szego | 29/6.1 |
| 4,149,649 | A | 4/1979 | Szego | 220/88 A |
| 4,249,669 | A | 2/1981 | Szego | 220/216 |
| 4,265,317 | A | 5/1981 | Knecht | 169/50 |
| 4,361,190 | A | 11/1982 | Szego | 169/48 |

(List continued on next page.)

FOREIGN PATENT DOCUMENTS

| | | |
|---|---|---|
| DE | 3435457 | 4/1986 |
| EP | Pub256239 | 2/1988 |
| FR | 601374 | 11/1925 |
| FR | Pub2440892 | 6/1980 |
| FR | 2692976 | 8/1988 |

*Primary Examiner*—William P. Watkins, III
(74) *Attorney, Agent, or Firm*—Parsons & Goltry; Michael W. Goltry; Robert A. Parsons

(57) ABSTRACT

An expandable metal product for use in extinguishing fires and in the prevention of or protection against explosions. The product is a continuous sheet of magnesium alloy foil having discontinuous slits in spaced apart lines parallel to each other but transverse to the longitudinal dimension of the sheet. The invention is also directed to the expanded form of the product, either in sheets which may be used for preventing fires or explosion or in the form of shaped ellipsoids for use in a passive inerting system for fuel tanks.

6 Claims, 12 Drawing Sheets

U.S. PATENT DOCUMENTS

| | | | | | |
|---|---|---|---|---|---|
| 4,440,076 | A | | 4/1984 | Mansfield | 428/92 |
| 4,461,054 | A | | 7/1984 | Oehlenschlager et al. | 220/88 R |
| 5,088,170 | A | | 2/1992 | Späth | 29/6.1 |
| 5,647,257 | A | | 7/1997 | Maida et al. | 29/6.2 |
| 5,738,175 | A | * | 4/1998 | Alhamad | 169/46 |
| 5,816,332 | A | * | 10/1998 | Alhamad | 169/45 |
| 6,062,316 | A | * | 5/2000 | Alhamad | 169/45f |

* cited by examiner

FIG.3A
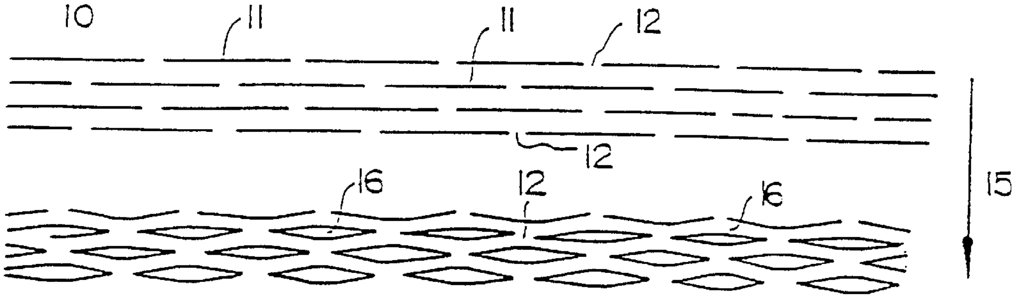
FIG.3B
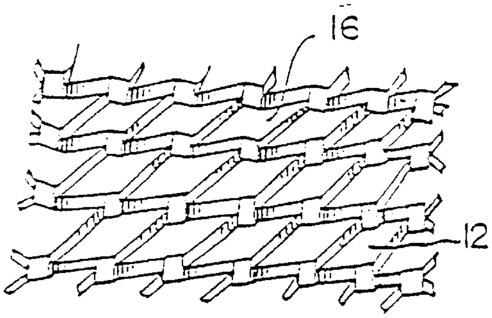
FIG.3C
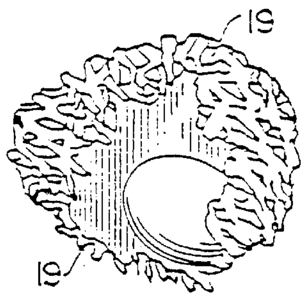
FIG. 4
FIG.5
FIG.3D
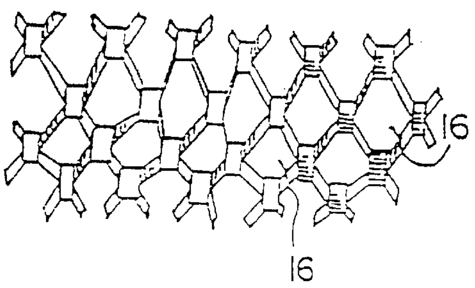
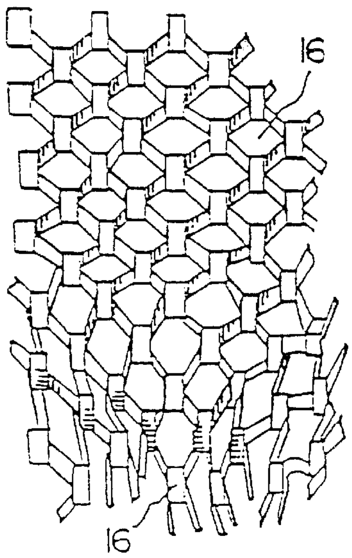
FIG. 3E FIG.9
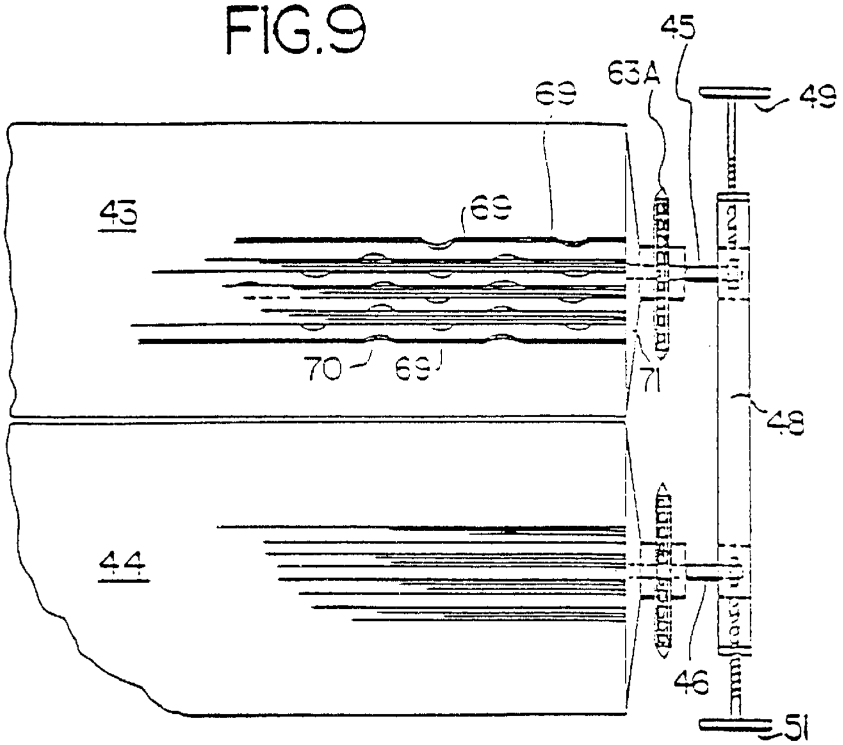
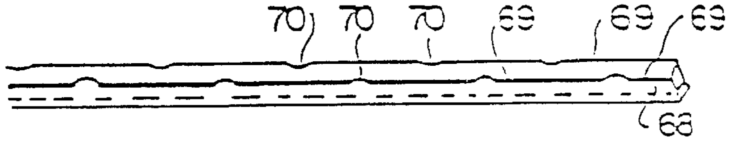
FIG. 10A
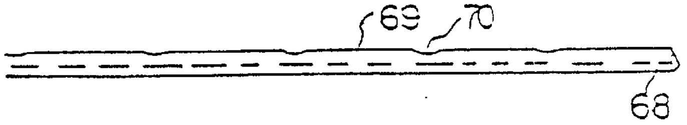
FIG. 10B

COMPOSITIONS OF MATTER FOR STOPPING FIRES, EXPLOSIONS AND OXIDATIONS OF MATERIALS AND BUILD UP OF ELECTROSTATIC CHARGES AND METHOD AND APPARATUS FOR MAKING SAME

This application is a continuation of U.S. application Ser. No. 09/658,595, filed Sep. 11, 2000, which is a continuation of U.S. application Ser. No. 08/561,293, filed Nov. 21, 1995, now U.S. Pat. No. 6,117,062, which is a continuation of U.S. application Ser. No. 08/414,106, filed Mar. 31, 1995, abandoned, which is a continuation-in-part of U.S. application Ser. No. 07/806,901, filed Dec. 12,1991, now U.S. Pat. No. 5,402,852, which is a division of U.S. application Ser. No. 07/674,277, filed Mar. 19, 1991, now U.S. Pat. No. 5,097,907, which is a division of U.S. application Ser. No. 07/417,696, filed Oct. 5, 1989, now U.S. Pat. No. 5,001,017, which is a division of U.S. application Ser. No. 07/280,317, filed Dec. 6, 1988, abandoned.

BACKGROUND OF THE INVENTION

The present invention relates to a unique form of expandable metal foil and to expanded metal nets made therefrom. The invention also relates to methods and apparatus for producing the said products, and to uses thereof, particularly in the extinguishing of fires and the prevention of explosions.

Surface fires, such as grassland and forest fires, as well as fires on the surface of water and on the surface of fuels in fuel tanks, are a continuing threat to life and property throughout the world. Over the years, numerous methods for combating such fires have been developed. The use of water, foams, chemicals and other quenching materials are well known.

It is also known to use blankets, mats, nets and other sheet-like materials to smother surface fires. However, these are heavy, bulky materials, and their use in widespread surface fires extending over thousands of acres of land or water, are subject to obvious limitations. Firefighting methods today are still limited to the steps of containing the fire as much as possible until it burns out or until changing weather conditions no longer support the burning. There is a need for a more efficient, inexpensive means for extinguishing fires which extend over wide surface areas.

There is also a need for more effective ways of preventing explosions in containers for fuels or other explosive substances. Containers such as fuel depots, liquid petroleum gas tanks, airplanes, ships, transport tankers, pipelines, and the like, are at risk from explosion caused by overheating, static electricity build up, mechanical impacts, etc. In addition to precautionary measures such as avoiding the above causes, a more recent approach to the problem has involved placing in the container a quantity of filling material in the form of a honeycomb shaped metal net—either in sheets or crumpled into balls. The theory of such approach is that the metal net promotes heat conduction and avoids static electricity build up, and thus reduces the risk of explosion. Although the approach has merit, there is nevertheless a substantial need for improvement, mainly because of deficiencies in the physical characteristics of the metal nets and balls, and also because of inefficiencies in the methods and apparatuses for producing such materials.

It is an object of the present invention to provide a product which is substantially more effective than known products, not only in the extinguishing of surface fires but also in the prevention of explosions in fuel tanks and the like.

It is a further object of the invention to provide a fire extinguishing product which can be transported to the site of a surface fire in compact, semi-manufactured form and then stretched to its fully manufactured form as it is applied to the surface of the fire over an extended area.

It is another object of the invention to provide a product for filling into containers for fuel and other explosive materials to provide a highly superior anti-explosive protection.

It is a still further object of the invention to provide unique methods and apparatus for production of the said new product.

Other objects and advantages will become apparent as the specification proceeds.

SUMMARY OF THE INVENTION

This invention is based on the development of a new form of an expandable slit metal foil which may be stretched into a three-dimensional metal net having unique properties. The expanded metal net is useful in extinguishing surface fires and also in the prevention of explosions in fuel containers and the like. It is also useful for other purposes, which will be explained hereinafter.

In one of its forms, the product of the invention is an expandable metal product comprising a continuous sheet of metal foil having discontinuous slits in spaced apart lines parallel to each other but transverse to the longitudinal dimension of said sheet. When said continuous sheet is stretched longitudinally, it is transformed into a three-dimensional metal net, and when said net is laid over a surface fire the fire is smothered and thus extinguished.

The fire extinguishing capability of the metal net is based on the phenomenon that flame at the surface of a burning material cannot pass upwardly through the pores or eyes of the metal net. In a normal fire, the heat of the burning causes material at the surface of the fuel to vaporize and mix with the oxygen in the atmosphere above it to produce a flammable mixture. If the metal net of the present sent invention is interposed between the surface of the burning material and the atmosphere, the heat conductivity of the metal net reduces the heat of the fire and thus reduces the amount of vapor being produced. The net also prevents the flame at the surface of the burning material from reaching the flammable mixture of vapor and atmosphere above the fire, and for these two reasons the conditions for continued burning are removed and the fire is extinguished.

The expandable metal product of the present invention provides a significant advantage in the fighting of fires covering a large surface area. In producing the expandable product, rolls of continuous metal foil are passed through banks of slitting knives to provide lines of discontinuous slits which are parallel to each other but transverse to the longitudinal dimension of the continuous sheet. The slitted sheet is then, in the same process, and without stretching, collected on a roll, ready for transportation to the site of a fire. In their unstretched form, the rolls are very compact, and large numbers of them can be transported by aircraft or other means to the location of a fire. At the fire, the metal foil is unrolled and stretched as it is applied to the surface of the fire. The stretching of the expandable product increases the surface area by approximately a tenfold factor. For example, if a roll of this material in its unstretched form is 44 cm wide and 500 m long, it will cover 220 square meters in its unstretched form, but this will be increased to 2,000 square meters in its stretched form. It will thus be seen that a substantial advantage is gained in terms of transporting the raw material in compact lightweight form and then transforming it by stretching to cover large areas of burning surface at the site of the fire.

In a specific embodiment of the invention, the rolls of slitted foil in the unstretched form can be carried in airplanes or helicopters over a burning area, and weights can be applied to the ends of the sheets, such that, as the weights fall toward the burning area, the foil unrolls and is stretched as it unrolls, thus covering the greatly expanded area of the stretched metal net.

It is a feature of the invention that, in the manufacture of the expandable metal foil, the transverse slit lines are made to extend to the longitudinal edges of the foil sheets, thus eliminating unslit longitudinal margins which might resist longitudinal stretching of the slit sheet when subjected to longitudinal tension. This feature enables the rolls of expandable metal foil to be stretched into metal nets as they are unrolled at the sites of fires, thus providing the very substantial gain in area of coverage, as described above.

In another of its forms, the metal net of the present invention is formed into small ellipsoid shapes which, by themselves or in combination with large sheets of expanded metal net, are useful not only for extinguishing surface fires but also for filling containers of fuel to prevent explosions therein. If the ellipsoids are to be used on the surface of water or other liquid, they are provided with floatable cores. In the practice of one embodiment of the invention, such ellipsoids are placed on the surface of the liquid fuel in a fuel tank and provide a floating surface layer on said liquid. The ellipsoid shape enables the units to nestle together on the surface, eliminating vacant spaces between them, thus providing a continuous surface cover with no gaps through which flame from the liquid can upwardly escape. In another embodiment, the ellipsoids are used to completely fill large or small containers of fuel, for the purpose of preventing explosion of the fuel; and in this arrangement also, the ability of the ellipsoids to nestle together provides a superior gap-free configuration. In this respect, the ellipsoidal units of the present invention are superior to metal nets which are crunched into the shape of spheres, since a layer of floating spheres inevitably leaves gaps or spaces between the spheres, through which flame or heat from the liquid fuel can escape upwardly.

In the practice of another embodiment of the invention, the above-described ellipsoids with floatable cores are distributed over a fire burning on the surface of water, and then sheets of the expanded metal net of the present invention are laid in place on top of the floatable ellipsoids, thus preventing the sheets of expanded metal net from sinking below the surface. In the practice of a further embodiment, the above-described ellipsoids are distributed in large numbers on the surface of land fires, and the ability of the ellipsoids to nestle together with each other provides a continuous layer of metal net for smothering the fires, similar to the manner in which the sheets of expanded metal net operate.

The present invention also relates to apparatus for producing an expandable metal product comprising a pair of opposing rotatable cylinders, means for rotating said cylinders at substantially the same speed, and means for passing a continuous sheet of metal foil between said cylinders, the first of said cylinders having spaced apart discontinuous knives attached to its outer surface in lines transverse to the longitudinal dimension of said continuous metal sheet, and the second of said cylinders having corresponding base members cooperating with said knives to produce lines of discontinuous slits in said continuous sheet of metal foil. In a variation of said apparatus, the slitting knives are replaced by spaced punches for the production of perforated sheets of metal foil.

A further embodiment of the invention relates to apparatus for forming sections of expanded metal foil into ellipsoidal shapes and for inserting floatable balls or other materials on the interior of said ellipsoids during the manufacture thereof.

BRIEF DESCRIPTION OF THE DRAWINGS

The objects, features and advantages of the invention will be apparent to those skilled in the art from the following detailed description, taken together with the accompanying drawings, in which:

FIGS. 3A through 3E are top views of the expandable metal product of the present invention, showing the change in configuration as the slitted sheet is pulled to open up the expanded metal net product.

FIG. 4 is a perspective view showing the ellipsoid form made from the expanded metal net of the present invention.

FIG. 5 is a perspective view of a hollow floatable ball which may be inserted on the interior of the ellipsoid form.

FIG. 9 is an elevational view showing the opposing cutting cylinders, together with some of the discontinuous spaced apart knives for cutting slits in the sheet of metal foil passed between said cylinders.

FIGS. 10A and 10B are perspective views of elongated keys of the present invention, holding double and single-edged knives which are attached to the surface of the cutting cylinder.

DETAILED DESCRIPTION OF THE INVENTION

The Product and Its Uses

Figure 2:
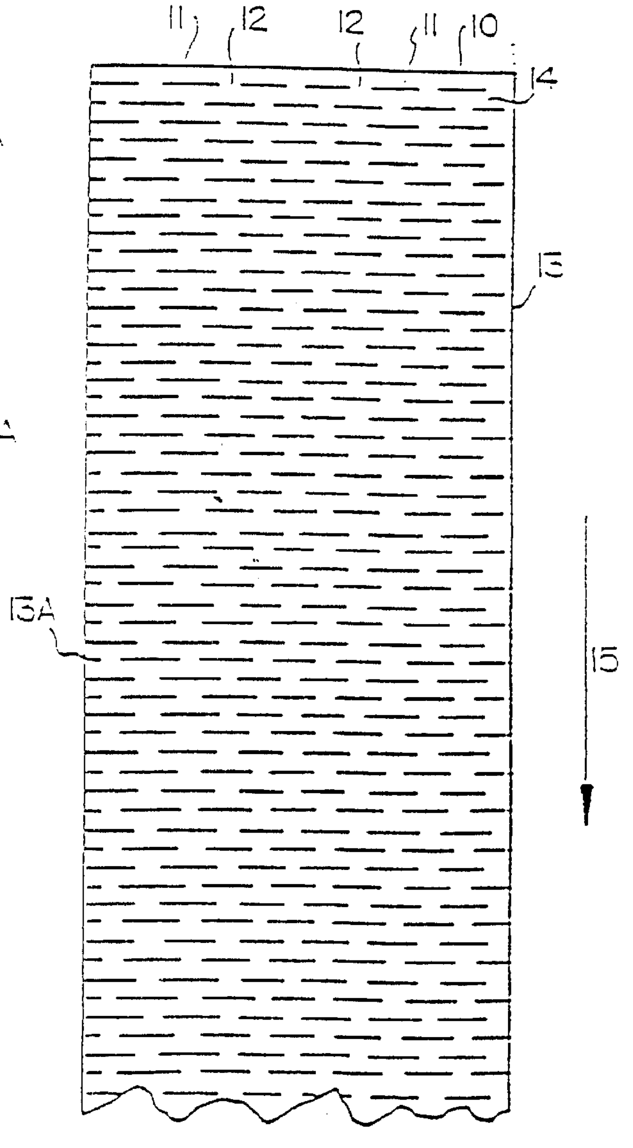
FIG. 2 is a top view of the expandable metal foil of the present invention, showing the pattern of transverse slits and the absence of margins.

Referring to the drawings, the expandable metal product of the present invention is exemplified by the continuous sheet of metal foil 10 shown in FIG. 2. As shown, the sheet of metal foil 10 is a small segment of a much longer sheet which normally is gathered in rolls containing a single sheet as long as 500 meters, or more. The width of the sheet 10 may be chosen from any number of practical dimensions. Widths in the range from 11 to 55 cm are preferred.

As noted, sheet 10 is provided with discontinuous slits 11 in spaced apart lines which are parallel to each other but transverse to the longitudinal dimension of the sheet 10. The slits 11 in each line are separated by unslit segments or gaps 12, and it will be noted that the slits 11 in each line are offset from the slits 11 in adjacent lines. Similarly, the gaps 12 in each line are offset from the gaps 12 in adjacent lines. The apparatus and method for producing the slitted metal foil 10 of the present invention are described in detail in the later section of this specification entitled "The Slitting Machine".

It is a feature of the invention that the slits 11 extend to and intercept the longitudinal edges 13 of sheet 10, so that there are no unslit margins in the product. Although normally the slits in each line will intercept the edges 13, an arrangement in which only alternate lines of slits intercept the edges is also within the purview of the invention.

For the firefighting uses of the expandable metal product it is desired that the metal foil be very thin and that the slits in each line and the spaces between lines of slits be very small. Thus, the thickness of the foil used to produce the product should be in,the range between 0.028 and 1.0 mm, and the preferred thickness is between 0.028 and 0.1 mm.

The length of each slit 11 is in the range between 1 and 2.5 cm, and the unslit sections or gaps 12 between each slit are in the range between 2 to 6 mm long. It is preferred that in any sheet, the dimensions of all the slits be uniform, as well as the dimensions of all the gaps, although practical variations of this are also within the spirit of the invention. As a specific example, a sheet having gaps 2 mm long between slits 15 mm long would be a useful combination. Other examples include sheets with gaps 2 mm long between slits 17 mm long; gaps 3 mm long between slits 17 mm long; gaps 3 mm long between slits 20 mm long; gaps 4 mm long between slits 20 mm long; and so on. The distance 14 separating lines of slits may be varied, depending on the thickness desired for the resulting expanded metal net. The distance 14 is ordinarily in the range between 1 and 4 mm, with either 1 mm or 2 mm being preferred.

For many of the uses contemplated for the product of the present invention, the kind of metal used in the metal foil may be selected from a wide number of metals or alloys which may be produced in the form of a thin foil. However, for firefighting purposes, a significant part of the invention is based on the discovery that expanded metal nets made from alloys of magnesium with certain other compatible substances have the unique ability to extinguish burning fires as well as prevent the burning or explosion of combustible materials. More specifically, in this embodiment of the invention, it is especially useful to use an alloy of magnesium with substances such as aluminum, copper, zirconium, zinc, strontium, Rn(electron), silicon, titanium, iron, manganese, chromium, and combinations thereof. Alloys such as the above have the valuable characteristics of not only being lightweight, strong, elastic, heat-conductive, etc., but also the important characteristic of being nonflammable. A particularly useful combination is the alloy of magnesium with aluminum and copper. Another preferred combination is the alloy of magnesium with zirconium and strontium. To a somewhat lesser degree, alloys in which aluminum is substituted for the magnesium, are useful in the practice of the invention. The invention is illustrated in a specific example by an alloy comprising 0.25% Si, 0.3% Fe, 0.01% Cu, 0.01% Ma, 10% Al, 0.1% Zn, 0.08–0.1% Ti, and the remainder Mg. Such a product possesses tensile strength of 300 N/mm, proof stress of 200 n/mm, elongation of 10%, and Brinell hardness of (5/250–30). The magnesium alloy used in the invention should contain at least 0.5% by weight of magnesium.

For certain uses, the product of the present invention may be combined with other materials. For example, if the expandable metal foil is coated with an alkaline bichromate, the resulting expanded metal net acts as a corrosion inhibitor, since the bichromate acts to remove water from fuels and their containers. Further, if the metal foil is combined with oleates or similar compounds, the fire extinguishing capability of the expanded metal net is enhanced, since the oleate emits a dense vapor which covers the burning material and assists in the smothering of the flame.

When the expandable metal foil product of the present invention, as shown in FIG. 2, is stretched by subjecting it to longitudinal tension, it is converted into an expanded metal prismatic net. In the stretching procedure, the horizontal surfaces of foil are raised to a vertical position, taking on a honeycomb-like structure. This conversion is shown in FIGS. 3A through 3E of the drawings. The expandable metal product 10 is shown in FIG. 3A prior to stretching. When longitudinal tension is applied in the direction of the arrow 15, the slits 11 begin to open, and the product assumes the appearance shown in FIG. 3B. The application of more tension causes a greater opening of the slits, and the product expands into the honeycomb-like, prismatic form shown in FIG. 3C. When even further tension is applied, the configuration becomes as in FIG. 3D, and finally when the greatest pulling force is applied, the expanded metal net appears as in FIG. 3E.

It will be noted that, as the tension increases from stage to stage, the slitted metal foil increases in area. The slits 11 are converted into eyes 16, and the sizes of the eyes 16 reach their maximum when stretched to the square configuration shown in FIG. 3C. Correspondingly, the area of the expanded metal net reaches its maximum at this point. Further stretching begins to reduce the size of the eyes, and FIG. 3E illustrates the return to eyes of the smallest dimensions. Thus, by controlling the extent of stretching, it is possible to produce an expanded metal prismatic net structure having the desired shape and size of eyes, and the desired expansion in area, depending on the use intended. The conversion illustrated in FIGS. 3A through 3E is also accompanied by an increase in thickness of the product, since the spaces 14 between slit lines assume a thickness dimension as the eyes open.

The increase in area when a slitted metal foil is stretched into an expanded foil prismatic net can be controlled not only by the extent to which the metal foil is stretched but also by the dimensions of the slits 11, the gaps 12 between slits, and the spaces 14 between lines of slits. For example, if a 250 cm sheet of foil is provided with transverse slits 2 cm in length with gaps of 2 mm between each slit, and a space of 1 mm between each line of slits, the foil sheet can be stretched to an average area of 2,272 square centimeters, with the thickness of the net being 2 mm (i.e., twice the value of the space 14 between each line of slits). If the spaces 14 between each line of slits are increased to 2 mm, the foil sheet can be stretched to an average area of only 1,136 square centimeters, but with a thickness of 4 mm. Thus, if the objective is to produce an expanded metal net having the maximum in area (as is desired in extinguishing surface fires), the preferred procedure is to keep the distance between lines of slits as small as possible while at the same time controlling the stretching of the sheet to produce the maximum size eyes, as in FIG. 3C. If greater thickness of the net is preferred, and area is not as important, as in the case of producing formed ellipsoids from the net or in manufacturing some of the construction or insulation materials to be described hereinafter, then the distance 14 between lines of slits may be substantially increased. The formula for calculating the increase in area as described above is:

$$\text{Area}=\text{Unstretched Area}\times[(a-b)/2c]\times[(a+b)/4]$$

Where:

a=length of slit 11 b=length of gap 12 c=distance 14 between lines of slits

By controlling the extent of stretching, as well as the dimensions of the slits 11, the gaps 12 between slits, and the spaces 14 between lines of slits, it is possible to take advantage of the strength, hardness and other properties of the alloy foil to produce expanded nets which may be formed into products having exceptionally high specific internal surface areas (e.g., in the range of 250 to 325 $ft^2$ per $ft^3$) and above; exceptionally high porosity (e.g., in the range of 80 to 99%); and a volume resistivity of <50 ohm-m. These characteristics make the expanded metal net particularly useful in the production of flame arresters and anti-explosion units, as will be explained in greater detail hereinafter.

Figure 1:
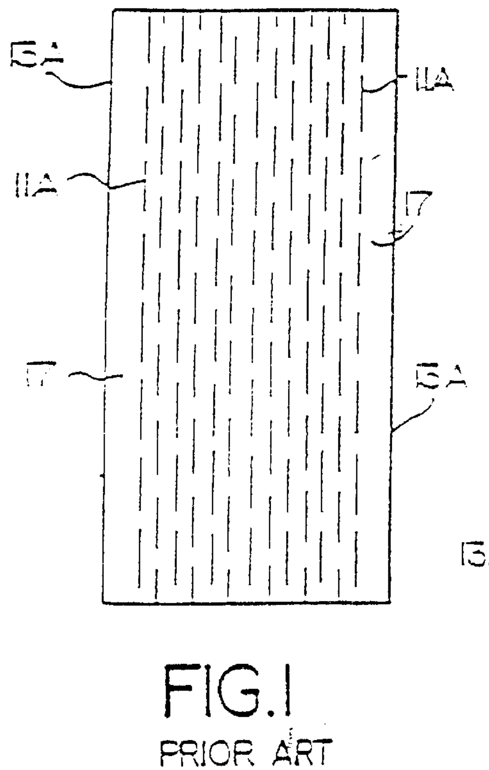
FIG. 1 PRIOR ART
FIG. 1 is a top view of a sheet of expandable metal foil made in accordance with prior art procedures, showing the pattern of longitudinal slits, as well as the margins along the edges of the sheet.

It is a feature of the invention that the lines of slits in the expandable metal foil are cut transverse to the longitudinal dimension of the long continuous sheet of foil. It is also a feature that the transverse slit lines extend to the longitudinal edges of the foil sheet, thus eliminating any unslit longitudinal margins. In the combination of these two features, the expandable metal foil of the present invention is different from expandable foil products which have been favored in the recent past. These distinctions can be understood by comparing the structures shown in FIGS. 1 and 2. FIG. 1 illustrates the configuration of slits in expandable metal foils as produced by prior art methods. It will be noted that the lines of slits IIA run parallel to the longitudinal edges 13A of the sheet of metal foil. It will also be noted, as shown in Schrenk U.S. Pat. No. 4,621,397, that substantial longitudinal margins 17 are left unslit. This is contrasted with the arrangement of the present invention, as shown in FIG. 2, wherein the lines of slits 11 run perpendicular to the longitudinal edges 13 of the continuous sheet, and the lines of slits 11 intercept the edges 13 so that there are no unslit margins.

The prior art product shown in FIG. 1 is made by slitting with banks of disc knives mounted at small intervals on a cylinder, with e.g., 2 mm between discs. The use of disc knives permits the slits 11A to be made only parallel to the longitudinal edges 13A of the continuous sheet. That is, the disc knife cylinder must have a horizontal axle which is mounted transverse to the longitudinal dimension of the continuous sheet being fed into the knives, and thus the knives produce slits which are parallel to the longitudinal dimension. It has been found that disc knives provide a less than satisfactory means for producing slits in rolls of metal foil, since it is difficult to prevent left and right slippage of the foil as it passes under the knives, especially if dust or metal pits are present. As a result, the slitting is imperfect, and expansion into appropriate metal nets is hampered. For this reason, it has not been possible to process sheets of foil more than about 15 cm in width.

A further disadvantage of the prior art procedure is that, since the slits 11A run parallel to the longitudinal edges 13A, the only way to stretch the foil into expanded form is to grasp the foil along the entire lengths of both longitudinal edges 13A and pull in a direction transverse to the longitudinal dimension of the sheet of foil. This has required that substantial unslit margins 17 be left along both longitudinal edges of the entire length of the sheet, so that the jaws of the longitudinal tensioning members have unslit sections of the sheet to grasp at each edge. The unslit margins 17 have generally been from 1 to 1.5 cm wide, and since the slit foil sheets which can be produced with disc knives can be no wider than about 15 cm, it will be understood that as much as 20% of the foil remains in unslit form. For all practical purposes, this is wastage, since the unslit portions cannot be used to expand the area of the resulting expanded net, and in fact the margins contribute only to an undesired addition of weight in the resulting net.

Further, continuous rolls of slit foil in which the slits run parallel to the longitudinal dimension of the foil sheet, as in the prior art illustrated in FIG. 1, cannot be stretched by pulling longitudinally. Thus, they are not capable of one of the important functions of the present invention—namely, transforming them into their expanded form while allowing them to unroll from an aircraft positioned above a fire. In the present invention, large area surface fires can be extinguished by a procedure which is enabled for the first time by the unique structure of the expandable metal foil product of the present invention. In this procedure, multiple rolls of the expandable metal foil are transported in an aircraft to a position above the fire. The expandable metal foil at this stage is in a semi-manufactured condition, in that the foil has been provided with slits but then rolled back up before stretching to the expanded form. In this semi-manufactured stage, the rolls of foil are very compact and occupy a minimum of space in the aircraft. As the next step, weights are attached to the free ends of the slitted foil on the rolls, and the weights are dropped out of the aircraft toward the surface fire. As the weights move downward, the effect of gravity unrolls the continuous sheets of slitted foil from the rolls while at the same time pulling and stretching the slitted foil to transform it into expanded metal nets of maximum area. In this manner, metal nets hundreds of meters long cover the fire immediately, causing the fire to be extinguished. The unique construction of the expandable metal net of the present sent invention, therefore, makes it possible to carry extremely compact rolls of the material to the scene of the fire and then, in a single step, apply it to the surface of the fire over an area ten times greater than the original area of the sheet. Prior art products, with slits running in the opposite direction, and with unslit longitudinal margins, were incapable of this.

In another embodiment of the invention, the expanded metal net of the invention is cut into small segments which are then formed into small ellipsoid shapes which in themselves are useful in extinguishing or preventing fires or explosions, or may be used in combination with larger sheets of the expanded metal net for such purposes. The ellipsoids generally have a short diameter in the range of 20 to 45 mm, and a long diameter in the range of 30 to 60 mm, with the distance between focal points measuring approximately two-thirds of the long diameter of the ellipsoid. In the preferred embodiment, the ellipsoids have a specific internal surface area in the range from about 250 to about 325 $ft^2$ per $ft^3$, with particular usefulness in the range from about 300 to 325 $ft^2$ per $ft^3$. The ellipsoids also are characterized as exhibiting and maintaining a porosity in the range of about 80 to 99%.

For certain purposes, it is desired to include in the ellipsoid a floatable core made of hollow balls or other floatable, non-flammable material. FIG. 4 shows the ellipsoid made from the expanded metal net of the present invention. In the embodiment shown, the ellipsoid 18 carries a floatable core 19 on its interior. FIG. 5 shows one form of a floatable ball useful as the core 19. The apparatus and method for producing these ellipsoids are described in detail in the later section of this specification entitled "The Machine for Producing Metal Net in Ellipsoid Form".

The ellipsoids of the present invention have a number of uses. Thus, in their floatable form, they may be distributed on the surface of flammable or explosive liquids, such as in fuel tanks, and in such configuration they provide a substantially improved anti-explosive or fire extinguishing function. Their ellipsoid shape causes them to nestle closely together, so that complete surface coverage is obtained, with no gaps through which flame from the liquid can upwardly escape.

In another application, the ellipsoids (without floating cores) may be used for filling of containers of fuel, for the purpose of preventing the explosion of such materials. In this respect, they are superior to prior art spheres which, because of their spherical shape, could not nestle together and therefore had gaps between them through which flame could escape. If containers, large or small, are completely filled with the ellipsoids, a large amount of fuel can still be added to the container, to occupy the interstices in the metal nets from which the ellipsoids are made; and in such an arrangement the container is rendered explosion-proof for all practical purposes. With such an arrangement, if a spark occurs anywhere on the interior of the tank, the ellipsoid material immediately dissipates the heat of such spark and thus prevents detonation. To explain with more particularity, it is known that, in order for an explosion to occur, it is necessary that three elements must be present--namely, pressure, proper mixture of fuel vapor and oxygen, and ignition. In many fuel tanks, particularly those which are only partially full, the mixture of fuel vapor and oxygen, and the potential for pressure, are normally present, and therefore an accidental spark, or even the overheating of the walls of the tank, may supply the ignition which sets off an explosion. However, when the tank is filled with the metal net ellipsoids of the present invention, the possibility of ignition is eliminated because the metal net, because of its high electrical conductivity (volume resistivity of $<50$ ohm-m), immediately conducts the heat of the spark away from the fuel vapor/oxygen mixture.

The very small size of the ellipsoids of the present invention, and their special ellipsoid shape, make them uniquely useful for filling tanks, especially those having small inlet openings. Comparable anti-explosive results may be achieved if the tank is filled with the expanded metal net of the present invention, in sheet form rather than ellipsoid, but usually such application requires installation of the sheets during construction of the tank. In either case, it is important that the ratio of the volume of the metal net (ellipsoid or sheet) to the volume of the tank be kept within certain ranges. Generally, if too little metal net is used, the anti-explosive function will not be achieved, whereas if the metal net is filled in the tank too densely, the amount of remaining space for the fuel will be unduly limited. It is a feature of the invention that the tank be completely filled with the expanded metal net material but at the same time the volume of the actual metal itself must be in the range of about 0.4 to 1.1% of the volume of the tank. That is, when the tank is filled with the expanded metal net, the tank still will have a remaining capacity of 98.9 to 99.6% for fuel.

Although this "passive inerting" of fuel tanks has been tested with other materials, such as reticulated plastic foam or aluminum net balls or batts, the ellipsoids of the present invention, because of their high specific internal area and porosity and because of their ellipsoid shape, provide an exceptionally effective fuel tank filler, which excels in terms of properties such as flame arresting, electrical conductivity, hydrolytic and thermal stability, protection against hydraulic ramming, the reduction of over-pressure, protection against corrosion and contamination, and resistance to compacting.

In another application, the ellipsoids with cores are a useful adjunct for use in combination with large sheets of the expanded metal net of the present invention in extinguishing fires on the surface of water. Thus, if the expanded metal net alone is laid on the surface of such a fire, its tendency would be to sink below the surface and thus lose its effectiveness. However, if prior to laying down the net, sufficient numbers of the floatable ellipsoids are spread at intervals on the surface, and the expanded net is then spread over the fire, the ellipsoids will assist in keeping the expanded net afloat in the position where it will be most effective in fighting the fire.

Finally, the ellipsoids without floatable cores can be used to extinguish land surface fires by covering the fire with large numbers of the ellipsoids. This may be accomplished by dropping burlap bags containing the ellipsoids into the surface fire and allowing the bags to burn and thus release the ellipsoids. The advantage of the ellipsoids in this configuration is that, by nestling together because of their shape, they tend to stay in one place rather than rolling downhill or across flat surfaces, as is the case with spheres.

The Slitting Machine

Figure 6:
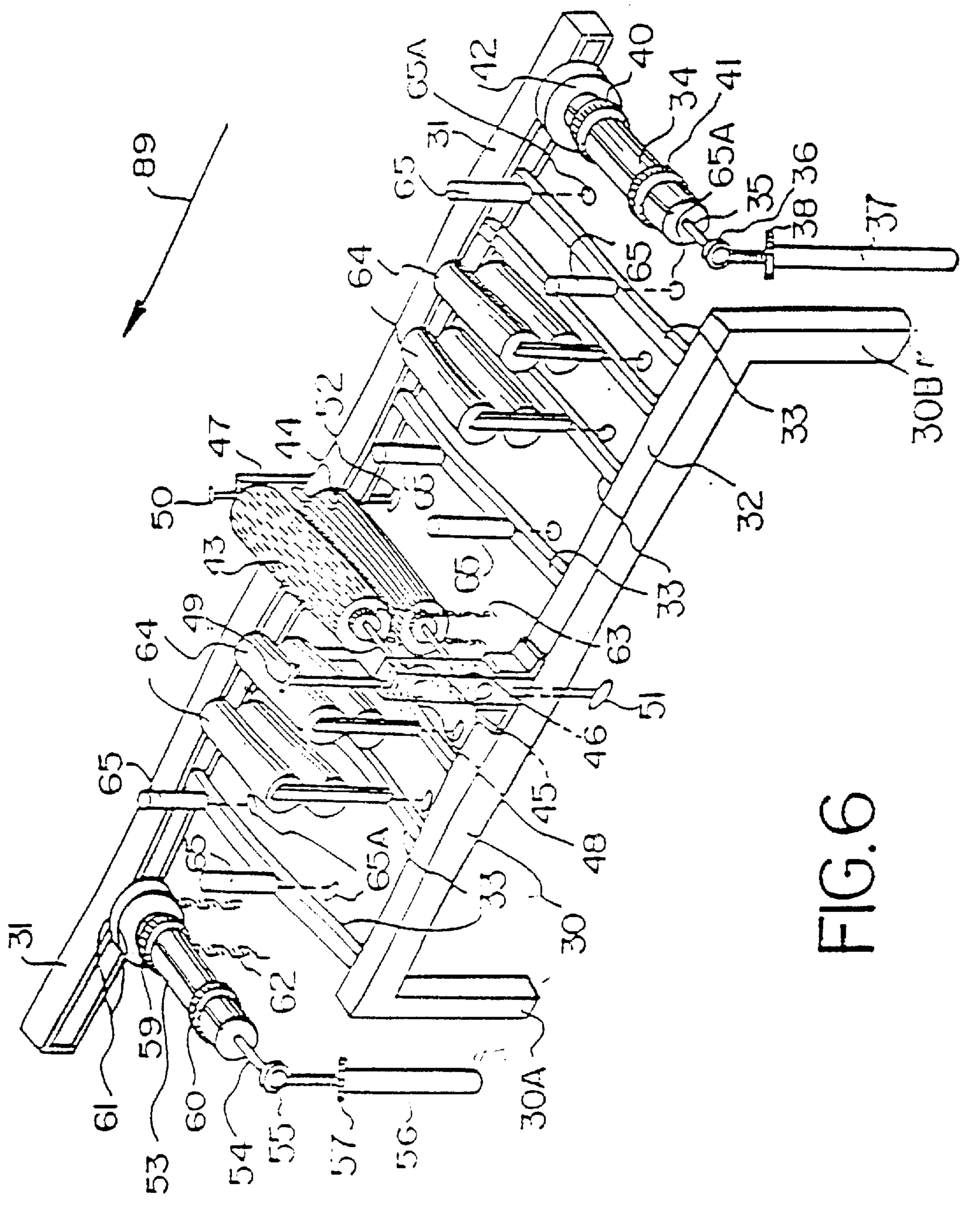
FIG. 6 is a perspective view of the apparatus for producing the slitted, expandable metal foil product of the present invention.

The machine which is used to produce the slits in the expandable metal foil product of the present invention is shown in FIGS. 7 through 16. Referring to FIG. 6, a perspective view of the machine is shown in which the movement of the metal foil sheet is generally in the direction indicated by the arrow 89. The machine has a frame 30 supported by legs 30A and 30B (as well as matching legs, not shown). The frame includes a pair of laterally spaced, longitudinally extending rails 31 and 32, designed to accept transverse supporting members 33, placed at appropriate intervals. These members have associated locking wheels 33A for adjusting and locking the members at the desired positions along the rails 31 and 32. Mounted at the input end of the machine is an input feed roller 34 for holding a roll of the continuous sheet of metal foil being supplied to the machine. The feed roller 34 has an axle 35, one end of which is secured in the rail 31, and the other end of which is held by a socket 36 adjustably held by an upright member 37. The adjusting wheel 38 is adapted to raise or lower the socket 36 to maintain the axle 35 in a generally horizontal position. An adjusting wheel 39 controls the left or right movement of the feed roller 34 on the axle 35, to provide proper alignment of the foil sheet as it is fed into the machine. Rings 40 and 41 are compaction members which are designed to prevent slippage of the foil on the feed roller. The pad assembly 42 contains a brake lining (not shown) to adjust the rotation speed of the axle 35.

Mounted on the frame 30 approximately midway along the length of the machine are a pair of opposing rotatable cylinders 43 and 44 which perform the function of slitting the metal foil sheet as it passes between them. Cylinder 43 carries on its surface spaced apart discontinuous knives in lines running along the length of the cylinder and transverse to the longitudinal dimension of the metal foil sheet passing under it. Cylinder 44 carries on its surface base members which cooperate with the knives on cylinder 43 to produce lines of discontinuous slits in the continuous metal foil sheet passing between the cylinders. Cylinders 43 and 44 are adapted to rotate on axles 45 and 46 respectively, which are journaled in upright members 47 and 48. Adjusting screws 49 and 50 work to raise or lower the height of cylinder 43, and adjusting screws 51 and 52 likewise raise or lower the height of cylinder 44, thus providing a means of adjusting the distance between the two cooperating cylinders 43 and 44.

Mounted at the takeoff end of the machine is a takeup roller 53 for rolling up the continuous sheet of metal foil which has just been slit by the slitting rollers 43 and 44. The takeup roller 53 has an axle 54, one end of which is secured in the rail 31, and the other end of which is held by a socket 55 adjustably held by an upright member 56. The adjusting wheel 57 is adapted to raise or lower the socket 55 to maintain the axle 54 in a generally horizontal position. An adjusting wheel 58 controls the left or right movement of the takeup roller 53 on the axle 54, to provide proper alignment of the foil sheet as it is rolled up on the roller. Rings 59 and 60 are compaction members which are designed to prevent slippage of the foil on the feed roller. The pad assembly 61 contains a brake lining (not shown) to adjust the rotation speed of the axle 54.

Figure 15:
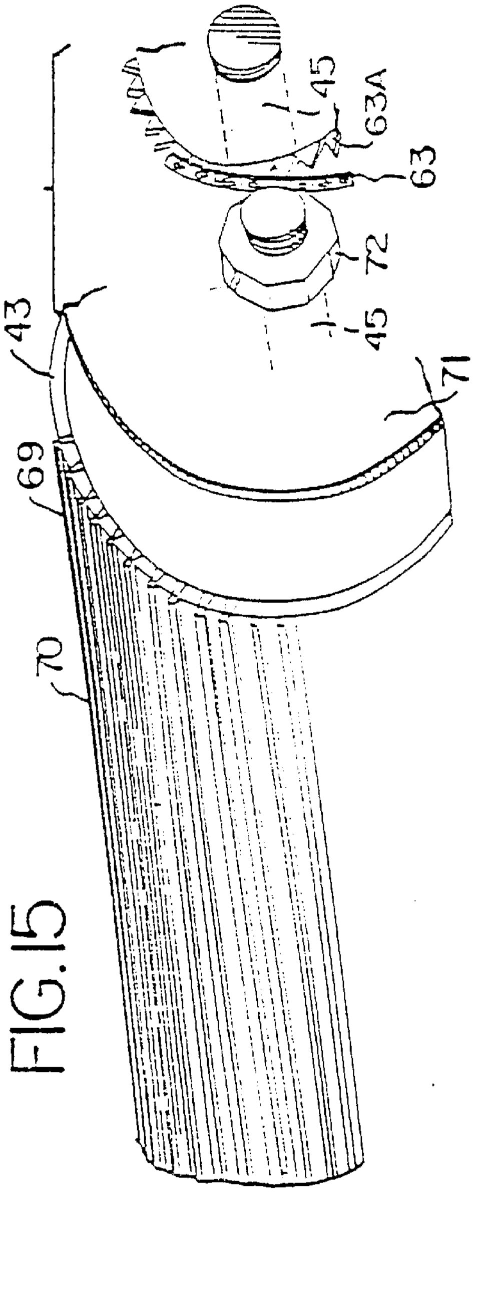
FIG. 15 is a perspective view of the first cutting cylinder, showing the circular end plate which is used to lock the keys in the keyways on the cylinder, as well as a portion of the driving mechanism for the cylinder.
Figure 16:
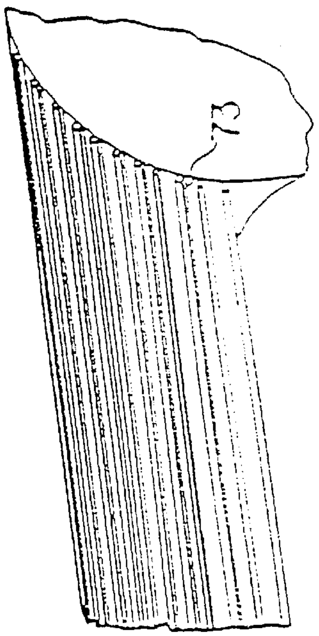
FIG. 16 is a perspective view of the second cylinder, carrying spaced apart keyways which cooperate with the slitting knife keys on the first cylinder to cut slits in the metal foil sheet.

The takeup roller 53 and the cutting cylinders 43 and 44 are all driven by a single source of power (not shown) through chains 62 and 63 (see FIGS. 9 and 15 for detail). The rollers 53, 43 and 44 may be driven at the same speed or, if desired, the takeup roller 53 may be driven at an increased speed by adjustment of the ring 61, depending on whether or not it is desired to stretch the slitted foil before gathering it on the takeup roller.

At appropriate intervals along the length of the machine, pairs of horizontal stabilizing rollers 64 are mounted on transverse supporting members 33 to guide and support the sheet of metal foil as it is fed from the feed roll 34 through the cutting cylinders 43 and 44 and finally wound up on the takeup roller 53. Likewise, at appropriate intervals, pairs of vertical stabilizing rollers 65 are mounted on the transverse supporting members 33 to prevent unwanted right or left shifting of the sheet of metal foil as it passes through the machine. The stabilizing rollers 65 have associated adjusting wheels 65A for locking them in the desired positions.

Figure 8:
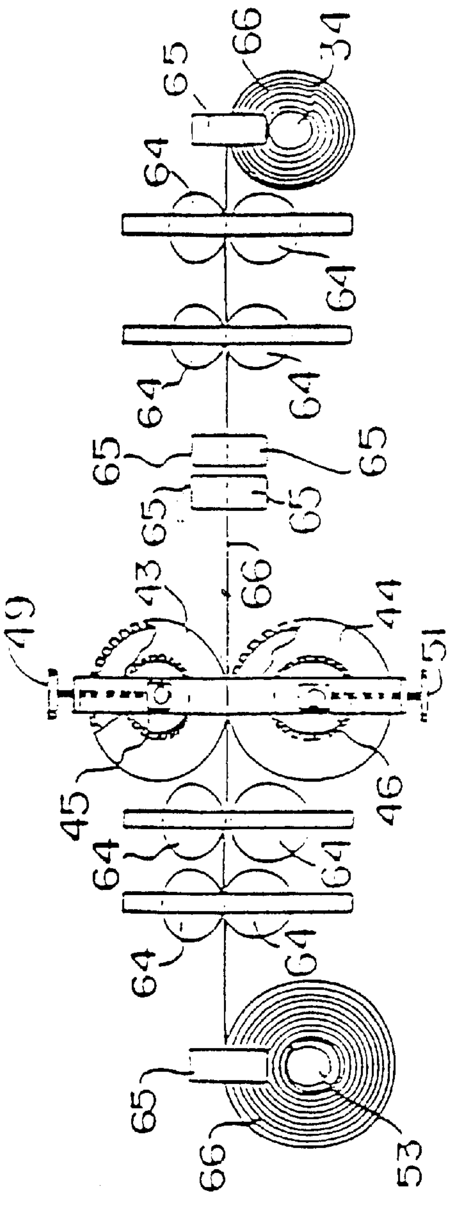
FIG. 8 is a side view of the same apparatus.
Figure 7:
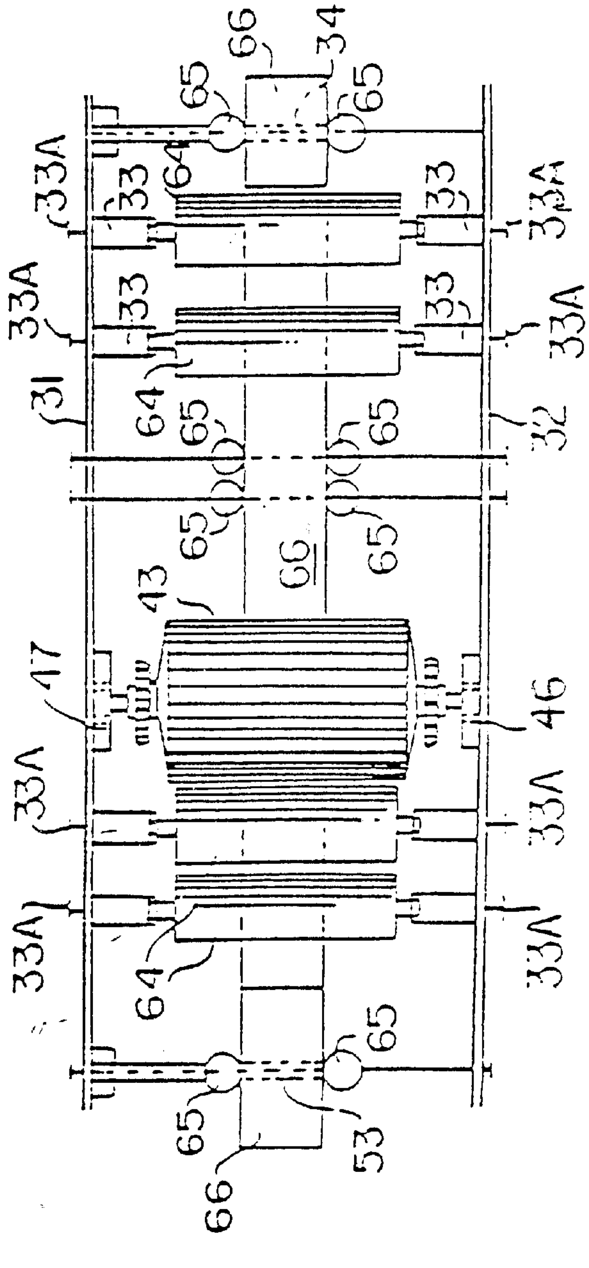
FIG. 7 is a top plan view of the same apparatus.
Figure 12:
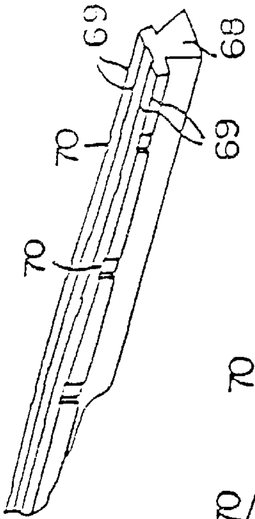
FIG. 12 is a perspective view of one of the elongated keys carrying 4 lines of spaced apart discontinuous slitting knives.
Figure 13:
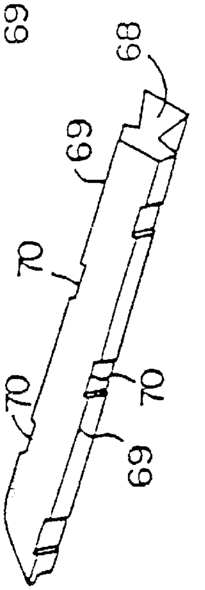
FIG. 13 is a perspective view of another of the elongated keys carrying 2 lines of spaced apart discontinuous slitting knives.
Figure 14:
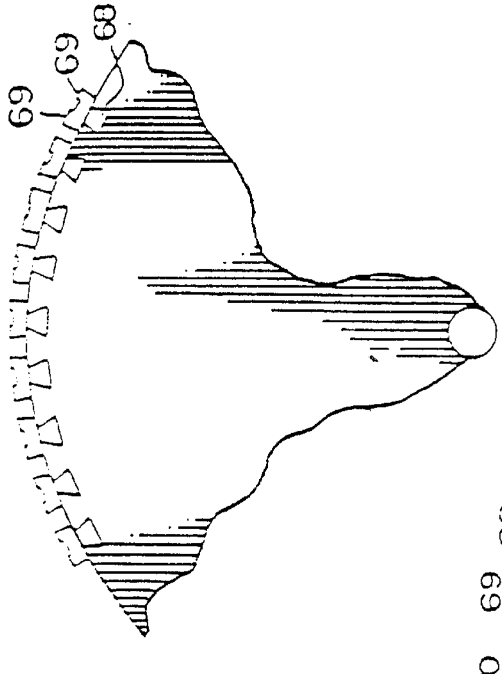
FIG. 14 is an end view of the first cutting cylinder, showing how the elongated knife keys fit in the keyways on the surface of the cylinder.

In the operation of the machine, referring to FIG. 6, as well as to FIGS. 7 and 8, the leading edge of a continuous sheet of metal foil 66 (see FIGS. 7 and 8) is taken from feed roll 34, passed between horizontal stabilizing rollers 64 and vertical stabilizing rollers 65, then between knife rollers 43 and 44, and then between additional horizontal and vertical stabilizing rollers 64 and 65, and finally gathered on takeup roller 53. After a section of foil 66 leaves the knife rollers 43 and 44, it has been provided with transverse lines of discontinuous slits and is ready, if desired, to be stretched into a honeycomb-like expanded metal prismatic net. This stretching can be accomplished immediately after slitting by causing the takeup roller 53 to rotate at a faster speed than the knife rollers 43 and 44, so that the slitted foil sheet is stretched as it travels from the knife rollers and is wound up on the takeoff roller as an expanded prismatic net. Otherwise, and for most applications involving the present invention, it is desirable that the takeup roller 53 rotate at substantially the same speed as the knife rollers 43 and 44, so that no stretching of the slitted metal foil takes place. In this manner, the metal foil is gathered into a compact roll in unexpanded form and thus occupies substantially the same volume as the roll of metal foil before slitting. This is the compact form of the product which is useful to transport in aircraft to a location above a surface fire, where the roll can be dropped toward the surface and stretched by the force of gravity as it drops to cover a greatly expanded area.

Figure 11:
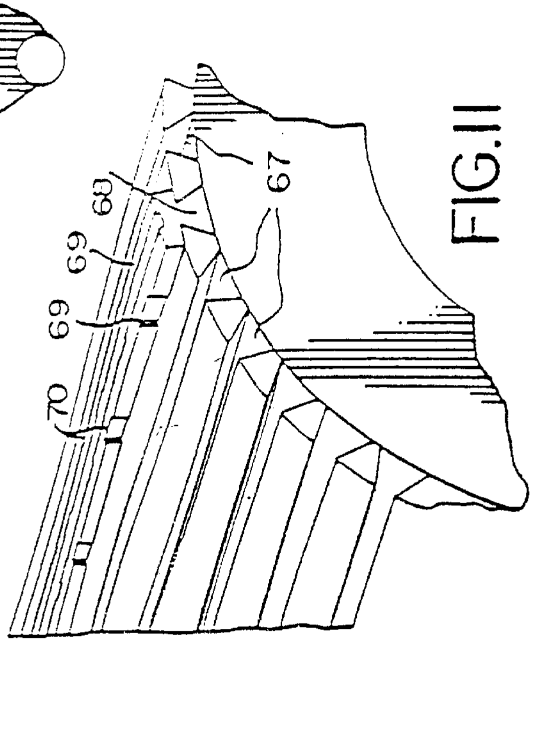
FIG. 11 is a perspective view of the first cutting cylinder, showing multiple spaced apart keyways on the surface of the cylinder and running the length thereof. Also shown inserted in one of said keyways is one of the elongated keys carrying a line of spaced apart slitting knives.

An important feature of the invention is the manner in which the cutting knives are mounted on the surface of the cylinder 43. The details of such mounting are shown in FIGS. 9 through 16. As best shown in FIG. 11, the surface of the cylinder 43 is provided with a series of parallel keyways extending lengthwise of the cylinder from end to end. The keyways 67 are trapezoidal in cross-section, with the narrower dimension at the surface of the cylinder and the larger dimension located inwardly. Slidably mounted in these keyways are elongated keys 68 carrying one or more lines of cutting edges or knives 69. The keyways or grooves 67 are provided over the entire circumference of the cylinder 43, and when the elongated keys 68 are inserted in all of these keyways, the cylinder 43 presents a continuous surface of parallel lines of knives running transverse to the line of travel of the metal foil sheet 66.

It will be noted that the knives 69 are discontinuous. That is, their cutting edges are interrupted at regular intervals by neutral sections 70, which are necessary to provide the gaps 12 in the slits 11 in the expandable metal foil product (See FIG. 2). The neutral sections 70 are offset from the neutral sections in adjacent lines, so that the slits in the metal foil will be staggered, in order to produce the expanded metal net. It will also be noted that each elongated key 68 may carry only a single cutting edge 69, as illustrated in FIG. 10B, or double cutting edges 69, as in FIGS. 10A and 13, or as many as four cutting edges 69, as in FIGS. 12 and 14. Since it is desirable for many purposes in the practice of the present invention to produce lines of slits which are very close together (e.g., 1 mm apart), the double or quadruple cutting edge arrangement shown in FIGS. 12 and 14 has been found to be extremely effective.

As best shown in FIG. 15, the elongated keys 68 are locked in place in the keyways 67 by an end plate 71, which in turn is secured by locking nut 72 screwed on axle 45. A corresponding end plate and nut (not shown) perform the same function at the other end of cylinder 43. The chain 63 and sprocket 63A used to drive the cylinder 43 are shown in detail in FIGS. 9 and 15.

Cooperating with the knife cylinder 43 is the opposing base cylinder 44. The surface of cylinder 44 may be, if desired, a plain hard plastic to provide a base against which the knives on cylinder 43 can press to produce the desired slits. A plain plastic surface is particularly useful in the case where the knives on cylinder 43 have a single edge, as shown in FIG. 10B. However, in the case where the elongated keys 68 on cylinder 43 carry multiple lines of cutting edges, separated by grooves, it has been found useful to provide the surface of cylinder with elongated raised base members 73 (see FIG. 16) which register with the said grooves between cutting edges of the elongated keys 68 on cylinder 43. It will be seen that, as the cylinders 43 and 44 rotate, the grooves between cutting edges on cylinder 43 register with the edges of matching raised base members 73 on cylinder 44, thus providing a slitting action on the metal foil which is between the two cylinders. If desired, the elongated raised base members 73 may be in the form of elongated keys which fit in elongated keyways on the surface of cylinder 44, similar to the manner in which the elongated keys 68 are inserted in matching keyways 67 on cylinder 43. Thus, when a particular set of knife keys are installed in the keyways on cylinder 43, a matching set of base keys may be installed at the same time in the keyways on cylinder 44.

In another embodiment of the invention, the slitting machine may be modified to cause perforation, rather than slitting, of the continuous metal foil passing between the cutting cylinders. The resulting metal foil thus contains multiple small perforations, rather than slits; and, while the perforated foil is not expandable to produce an expanded metal net in prismatic form, it is useful in certain circumstances for spreading over a burning fire to extinguish the same.

Figure 19:
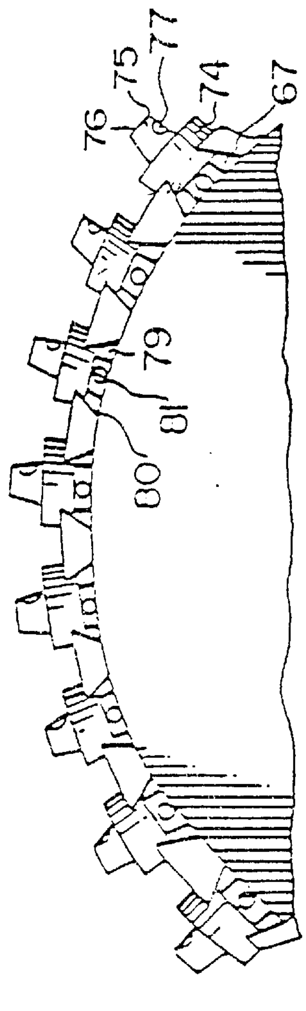
FIG. 19 is an end view of the first cutting cylinder, showing how the elongated keys carrying the punches are fitted into the keyways in the surface of the cylinder.
Figure 17:
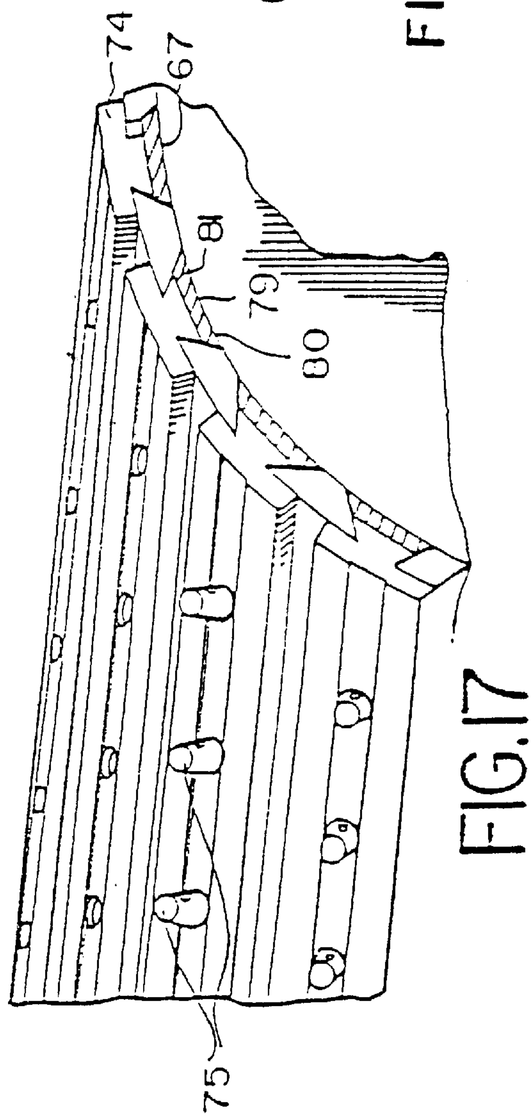
FIG. 17 is a perspective view of the first cutting cylinder, wherein the elongated keys which are inserted in the keyways carry rows of cylindrical punches for cutting round holes or perforations in the metal foil sheet.
Figure 18A:
FIG. 18 is a perspective view of two of the cylindrical punches designed for use in the arrangement shown in FIG. 17.
Figure 18B:
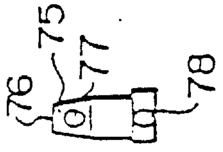

The modification to provide perforations instead of slits is illustrated in FIGS. 17 through 19 and involves the use of elongated keys carrying rows of small hollow punches, instead of rows of slit-cutting edges as in the previous embodiment. In this embodiment, the cylinder 43 is provided with the same keyways 67, but the elongated keys inserted in these keyways are provided with hollow punches, as shown in FIGS. 17 through 19. The keys 74 have rows of spaced apart hollow cutting punches 75 which may be permanently installed on the elongated keys, or removably installed by the use of threads, friction or other means. The punches 75 are hollow, with a circular cutting edge 76 at one end, a side outlet hole 77 which is exposed above the key 74 when installed, and a bottom outlet opening 78. It is a feature of this embodiment that keys 74 do not completely occupy the keyways 67, so that a space 79 is left between the bottom 80 of the key 74 and the bottom 81 of the keyway. Thus, the loose pieces of foil which are punched out of the foil sheet may be removed by passing out through the side outlet opening 77 or the bottom opening 78. When exiting through the bottom opening 78, the loose pieces fall into the elongated space 79 in each keyway and may then be blown out of the cylinder by any suitable air jet means (not shown). In this embodiment, it is preferred that the bottom cylinder 44 be provided with a continuous hard plastic surface, against which the punches 75 may bear to cut the perforations.

Figure 20:
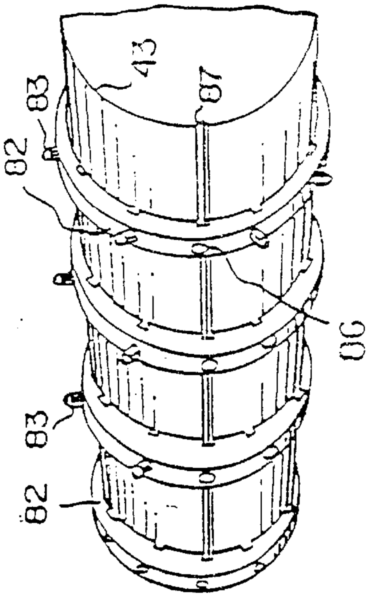
FIG. 20 is a perspective view of the first cutting cylinder fitted with a modified arrangement for punching holes or perforations in the metal foil sheet.
Figure 21:
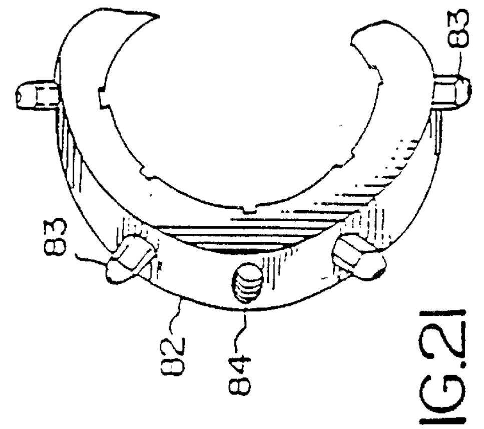
FIG. 21 is a perspective detail view of one of the rings carrying the cylindrical punches, under the arrangement shown in FIG. 20.
Figure 22:
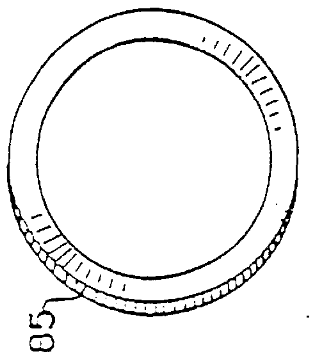
FIG. 22 is a perspective detail view of one of the spacer rings used in the arrangement shown in FIG. 20.
Figure 23A:
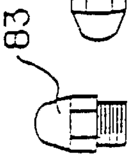
FIG. 23 is a perspective detail view of the threaded cylindrical punches used in the arrangement shown in FIG. 20.
Figure 23B:
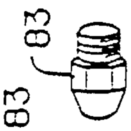
Figure 24:
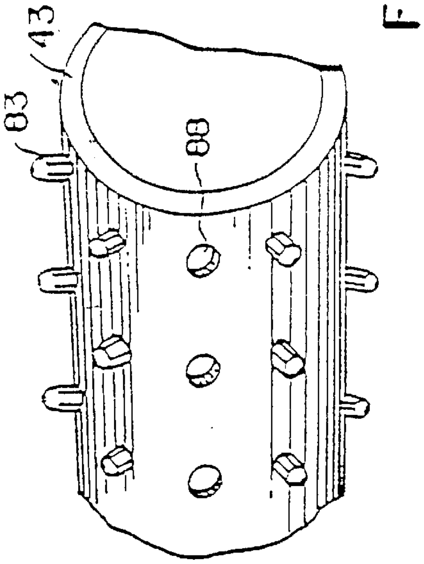
FIG. 24 is a perspective view of another arrangement for a cylinder carrying threaded punches for cutting perforations in a metal foil sheet.

A still further embodiment for using the said machine for perforating metal foil is shown in FIGS. 20 through 23. In this embodiment, multiple rings 82 whose inside diameter matches the outside diameter of cylinder 43 are installed on the cylinder 43, as shown in FIG. 20. The rings carry hollow punches 83, which may be permanently installed in the rings or threadably inserted in the holes 84 thereof. The rings 82 may be placed on the cylinder 43 in contact with each other, or they may be spaced apart by use of spacer rings 85, depending on how densely the foil sheet is to be perforated. As shown in FIG. 20, the rings 82 may be locked into place on the cylinder 43 by use of lock nuts 86 which register with key-ways 87 in the surface of cylinder 43. FIG. 24 shows another modification in which the hollow punches 83 are screwed directly into holes 88 in the surface of cylinder 43.

The Machine for Producing Metal Net in Ellipsoid Form

Figure 25:
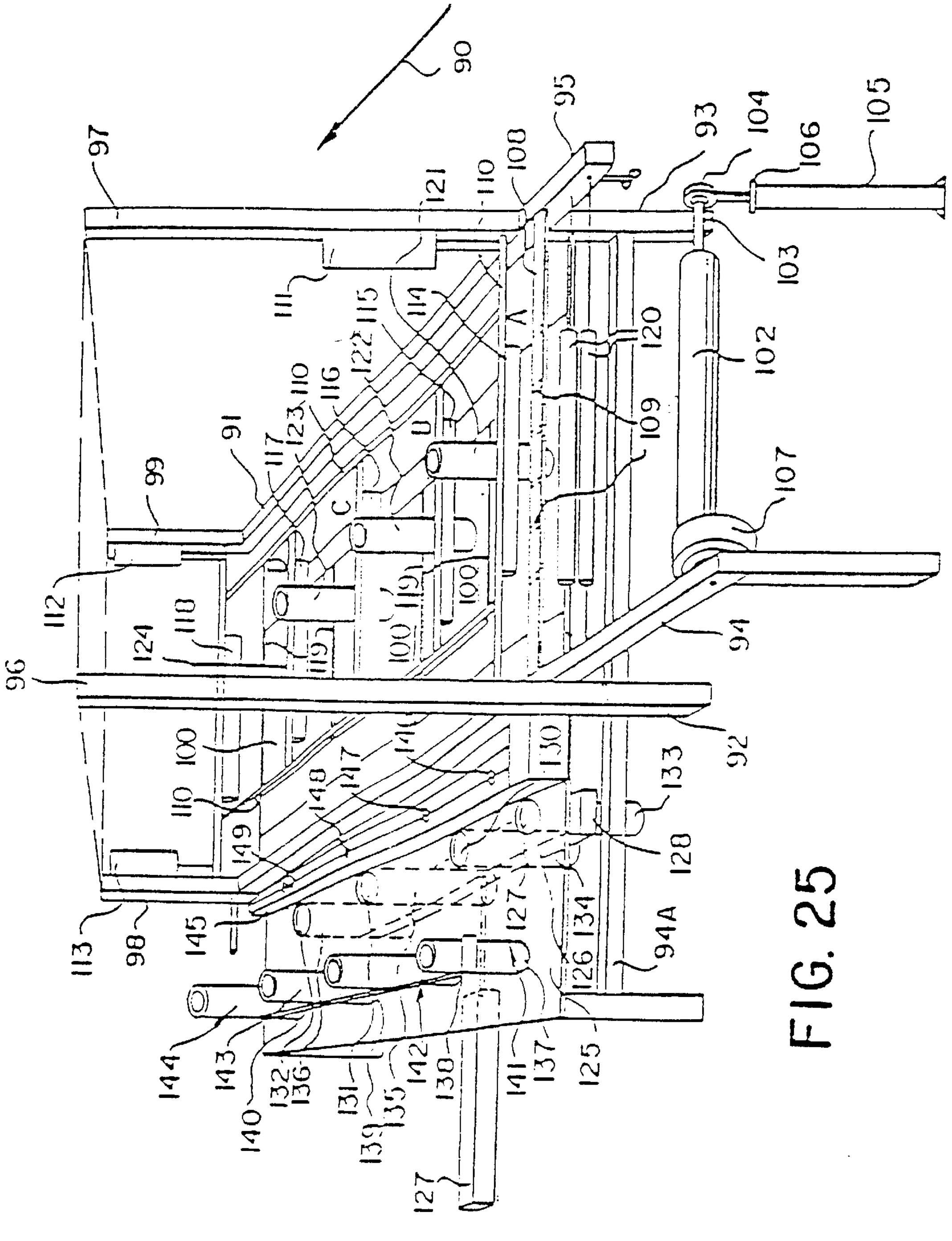
FIG. 25 is a perspective view of the machine for converting the expandable metal foil product of the present invention into the form of an ellipsoid.
Figure 26:
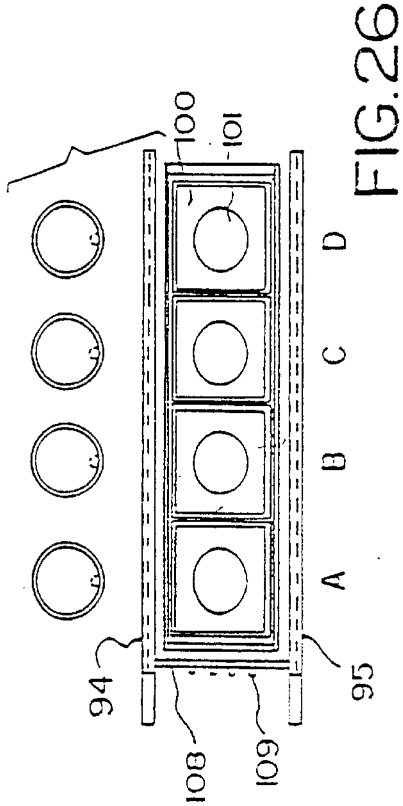
FIG. 26 is a top plan view showing multiple work stations located on the frame of the ellipsoid machine.

The machine for producing the ellipsoid form of the metal net of the present invention is shown in FIGS. 25 through 31B. Referring to FIG. 25, a perspective view of the machine is shown, in which the movement of the slitted metal foil sheet is generally in the direction indicated by the arrow 90. The machine has a frame 91 supported by legs 92 and 93 (as well as matching legs, not shown). The frame includes a pair of laterally spaced, longitudinally extending rails 94 and 95, as well as upright members 96, 97, 98 and 99 positioned generally at the four corners of the frame. The frame also includes a pair of laterally extending rails 94A and 95A (95A is hidden from view in FIG. 25) which support a lateral horizontal extension 125.

In the embodiment shown in the drawings, the frame 91 carries four work stations A, B, C, and D, each of which includes a generally rectangular guide plate 100 having a centrally located hole 101, best shown in FIGS. 29, 30, 31A and 31B.

Mounted at the proximal, input end of the machine is an input feed roller 102 for holding a roll of the continuous sheet of slitted metal foil being supplied to the machine. The feed roller 102 has an axle 103, one end of which is secured in the rail 94, and the other end of which is held by a socket 104 adjustably held by an upright member 105. The adjusting wheel 106 is adapted to raise or lower the socket 104 to maintain the axle 103 in a generally horizontal position. The pad assembly 107 is used to adjust the rotation speed of the axle 103.

At the proximal end of the machine, slightly downstream from the feed roll 102, a transverse grasping member 108 is mounted with its ends riding in the tracks provided by rails 94 and 95. The grasping member is fitted with spaced clips or hooks 109 which are designed to engage the leading edge of the continuous sheet of slitted metal foil on feed roll 102. Means are provided for moving grasping member 108 from its beginning position shown in FIG. 25 to the distal end of the machine, thereby pulling the metal foil sheet down the length of said frame 91 into position above the work stations A, B, C and D. The means for moving the grasping member 108 is synchronized with the speed adjustment means 107 on feed roll 102 so that the movement of the continuous sheet of foil leaving the feed roll is slowed to a rate of travel less than that of the grasping member 108, whereby the difference in rates of movement cause the section of slitted metal foil between the feed roll and the grasping means to be stretched into an expanded metal net.

Mounted above first frame 91 is a second frame 110, which has a rectangular shape generally conforming to the shape of frame 91. Frame 110 is adapted to be reciprocated vertically toward and away from frame 91 by the action of synchronized power cylinders 111, 112 and 113 (and an additional power cylinder, not shown) mounted on upright members 97, 99, 98 and 96, respectively. Attached to the longitudinal rails of the frame 110 are five transverse cutting knife members 114, 115, 116, 117 and 118. Cutting knife member 114 is located between the feed roll 102 and station A; knife members 115, 116 and 117 are located between stations A, B, C and D respectively; and knife member 118 is located downstream from station D. Mounted on frame 91, between each of the guide plates 100, and beneath each of said transverse knife members is a base member 119 against which the knife members bear to perform the cutting action. Thus, when the frame 110 is reciprocated toward frame 91, the transverse knife members make contact with the base members 119 and cut the metal foil sheet between said members to provide a generally rectangular individual sheet of expanded metal net positioned above each of work stations A, B, C and D. Also mounted between rails 94 and 95 of frame 91 are a pair of transverse rollers 120, through which the continuous sheet of metal foil is threaded, and which serve to hold the leading edge of said continuous sheet after the knife 114 has severed the rectangular section of metal foil covering station A.

Figure 27:
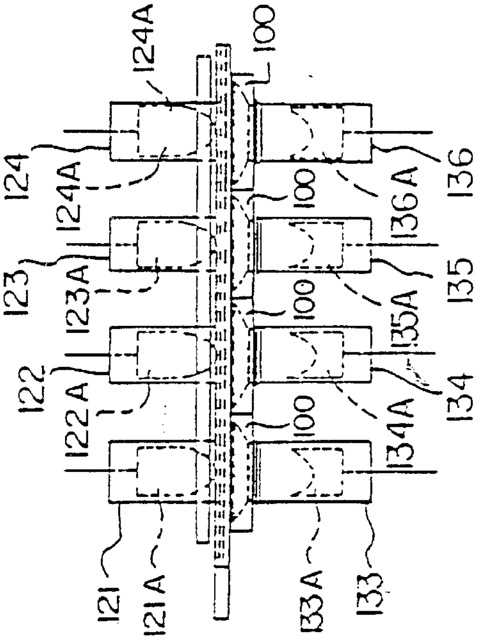
FIG. 27 is a side view showing the male molding pistons and their casings and the female molding pistons and their casings, in place at each of the work stations on said ellipsoid forming machine.
Figure 28:
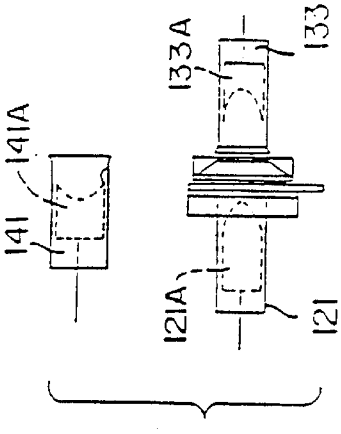
FIG. 28 is a detail view showing the shape of the male and female molding pistons and the closing piston.
Figure 29:
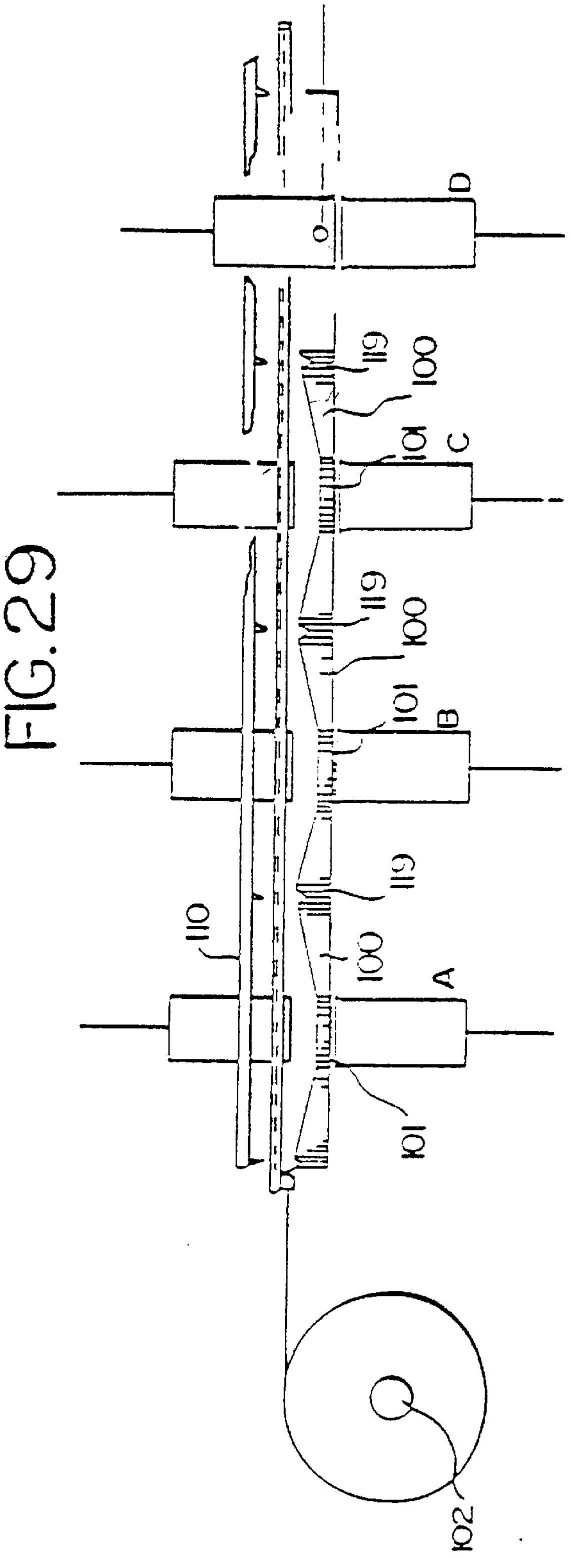
FIG. 29 is another side view showing the work stations and the second frame carrying the cut-off knives and the male molding pistons, as well as the third frame carrying the female moldings pistons.
Figure 30:
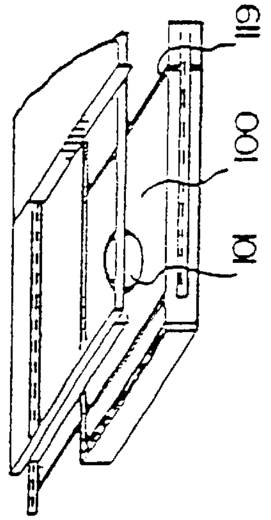
FIG. 30 is a perspective fragmented view of one of the work stations, showing the cut-off knives and the guide plate for the opposing molding pistons.
Figure 31A:
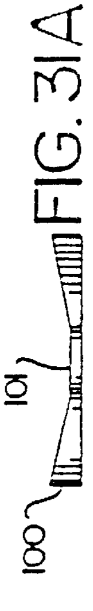
FIGS. 31A and 31B are side and top views showing details of one of the guide plates for the molding pistons.
Figure 31B:
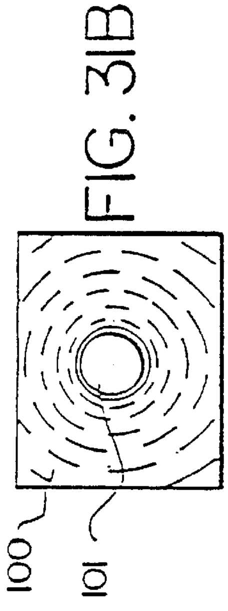

Vertically mounted on second frame 110 are four casings 121, 122, 123 and 124 holding four male molding pistons 121A, 122A, 123A and 124A respectively, said pistons being adapted to reciprocate up and down within said casings, driven by power means, not shown. (See FIGS. 27 and 28.) Said pistons are aligned generally with the central holes 101 in the guide plates 100 at each of work stations A, B, C, and D, so that when frame 110 has been reciprocated downwardly toward frame 91, the male molding pistons are caused to enter said holes, thus intercepting the plane of the expanded metal foil sheet positioned above said guide plate 100, and causing the foil to be pushed downwardly through said hole 101. As shown in FIGS. 27 and 28, the leading edges of said male molding pistons 121A, 122A, 123A and 124A have the shape of a semi-ellipsoid.

Located underneath frame 91 is a third frame 126 which has a rectangular shape generally conforming to the shape of frame 91. Frame 126 is adapted to be reciprocated laterally back and forth from a position underneath the work stations A, B, C and D on frame 91 to a position underneath lateral extension 125, by the action of power cylinder 127. Extensions such as member 128 ride in the tracks of rails 94A and 95A to guide frame 126 in its horizontal reciprocal movement as described above.

Third frame 126 has four holes 129, 130, 131 and 132 which register with the holes 101 in guide plates 100 at each of work stations A, B, C and D when frame 126 is in place under frame 91. Mounted on the underside of frame 126 are four open top casings 133, 134, 135 and 136, whose open tops register with the four holes 129, 130, 131 and 132 respectively. Said casings hold four female molding pistons 133A, 134A, 135A and 136A, said pistons being adapted to reciprocate up and down within said casings, driven by power means, not shown. The molding surfaces of said female molding pistons have the shape of a semi-ellipsoid.

The lateral horizontal extension 125 of frame 91 has four holes 137, 138, 139 and 140 which register with holes 129, 130, 131 and 132 respectively when third frame is in position underneath extension 125. Mounted on the top-side of extension 125 are four open bottom casings 141, 142, 143 and 144, whose open bottoms register with the four holes 137, 138, 139 and 140 respectively. The casings hold four female closing pistons 141A, 142A, 143A and 144A respectively, said closing pistons being adapted to reciprocate up and down within said casings, driven by power means not shown. The molding surfaces of said closing pistons have the shape of a semi-ellipsoid.

In the operation of the machine, a roll of slitted metal foil (unstretched) is placed on feed roll 102, and power cylinder 127 is activated to move third frame 126 in position under first frame 91. The leading edge of the slitted metal foil sheet on feed roll 102 is threaded through horizontal rollers 120 and then engaged by the clips 109 on transverse grasping member 108. The power means for moving member 108 is activated so that member 108 is moved down the length of frame 91 to the distal end thereof, thereby unrolling the slitted metal sheet from feed roll 102 and pulling the same across the four work stations A, B, C and D. Since the rate of movement of the grasping member 108 is greater than the rate of movement of the slitted metal sheet leaving feed roll 102, there is a resulting stretching of the metal foil, such that by the time the grasping member reaches the distal end of frame 91, the slitted metal sheet has been transformed into an expanded metal net in prismatic or honeycomb form.

At this point, power means 111, 112 and 113 are activated to move reciprocating second frame 110 downwardly toward frame 91. As frame 110 makes contact with frame 91, the horizontal knives 114, 115, 116, 117 and 118 mounted on frame 110 bear against corresponding base members 119 which are mounted on frame 91 to thus sever the sheet of expanded metal net into four separate, generally rectangular sheets, one of said sheets being positioned above each of stations A, B, C and D. The end of the slitted metal net which is severed by knife 114 becomes the leading edge for operation of the next cycle of the machine and is held between rollers 120 awaiting the beginning of said cycle.

While second frame 110 is still in its down position, as described above, the power source for male molding pistons 121A, 122A, 123A and 124A is activated, thus driving said pistons downwardly toward and through the plane of the metal net sheet positioned above each of stations A, B, C and D. Simultaneously, the power source for female molding pistons 133A, 134A, 135A and 136A (mounted on the underside of third frame 126) is activated, thus driving said pistons upwardly to register with their corresponding male molding pistons. As a result of such molding action, the separate sheets of metal net at each station are formed into hollow semi-ellipsoid shapes having an open top, such semi-ellipsoids being retained in the casings 133, 134, 135 and 136 which are mounted on the bottom side of third frame 126.

Following this, the power cylinders 111, 112 and 113 are activated to move second frame 110 upwardly away from first frame 91, and the male molding pistons are also reciprocated upwardly. At the same time, power cylinder 127 is activated to move third frame 126 laterally into position below lateral extension 125. In this position, the casings 133, 134, 135 and 135, each holding a hollow, open-top semi-ellipsoids of metal net, are positioned below the casings 141, 142, 143 and 144 mounted on the topside of lateral extension 125. The power means for the female closing pistons 141A, 142A, 143A and 144A is then activated, and said closing pistons move downwardly to close off the hollow semi-ellipsoid forms into finished metal net ellipsoids.

Finally, the closing pistons are reciprocated upwardly, the metal net ellipsoids are ejected from their casings, and power cylinder 127 is activated to move third frame 126 back to its original position under first frame 91, ready for start of the next cycle.

In an embodiment of the invention wherein floatable balls or other materials are inserted on the interior of the metal net ellipsoids, a floatable ball reservoir 145 is mounted above lateral extension 125, at a point intermediate between the stations A, B, C and D and the point where the closing pistons operate. Thus, when third frame 126 is being moved from its position under first frame 91 toward its final position under the closing pistons on lateral extension 125, it is possible to cause frame 126 to pause under floatable ball reservoir 145, so that a ball may be dropped through bottom holes 146, 147, 148 and 149 into the open tops of the hollow semi-ellipsoids resting in casings 133, 134, 135 and 136 respectively. The movement of third frame 126 is then continued to the final position where the hollow semi-ellipsoids containing the floatable balls are closed into completed ellipsoid form.

It will be understood that the entire operation as described above may be performed on a roll of metal foil which has already been expanded into the prismatic net form. The only difference in the operation under such circumstances is that the speed of movement of the grasping member 108 would be synchronized with the speed of rotation of feed roll 102, such that no further stretching of the metal net would take place.

Other Uses for the Product of the Present Invention

By substituting other materials for the metal foil in producing an expandable product, it is possible to use the product in a number of different industries or applications, such as the packaging, insulation, or construction industries or as decorative items.

For example, if cardboard or strong kraft paper is used as the material, and if the placement of the knives on the slitting machine is adjusted for wider spaces between lines of slits, an improved packing or insulation material can be made for use in place of materials such as corrugated cardboard or air bubble insulation. The difficulty with present insulation materials is that they must be manufactured in finished form at the insulation plant and then transported in their bulky finished form to the different sites where they will be used. By use of the present invention, however, slitted cardboard or plastic sheets can be produced at the manufacturing site and then, prior to stretching into the net form, they can be transported in their compact, unstretched form to the place of use, where they can be stretched into final net or honeycomb form for use in producing boxes, spacers or other insulating items similar to the corrugated cardboard presently used. Thus, transportation and storage of large bulky items can be avoided.

In the roofing industry, the product of the present invention can be used as an improved replacement for the layers of tar-saturated cardboard covered with sand presently used for protecting and insulating roofs against water and heat or cold. The current procedure being used in the industry involves laying down a layer of tar saturated cardboard and then covering with a layer of sand, then another layer of tar or pitch, and a further layer of sand, and so on until the desired thickness for insulation has been accomplished. In the practice of the present invention, a single effective layer can be produced by adding an intermediate stage to the operation of the slitting machine. Thus, cardboard is used as the sheet material being fed to the machine, and the pulling speed of the takeoff device is adjusted to stretch the slitted sheet as it issues from between the slitting rollers. At this stage, before the sheet is removed from the machine, it passes over a work station where a mixture of melted tar and sand is distributed in the cells or eyes of the expanded net and a final layer of thin sand particles is distributed on the surface prior to hardening. The product is then hardened by a blast of cold air and then collected in rolls or sheets on the takeoff device. The resulting product can be used as a single layer for the insulation of roofs, in place of the labor-consuming multiple layers currently used. In another embodiment, rolls of slitted cardboard in unstretched, compact form can be transported to the construction site, where the material can be stretched into expanded net form, laid in place, and filled with tar and sand in situ.

In the construction industry, the metal nets of the present invention may be used to produce improved construction materials such as briquettes, tiles, wall board, ceiling tiles, and the like. For example, if the metal net is made from thin, strong, elastic material such as the aluminum or magnesium alloys described hereinbefore, it can be used as a reinforcing web on the interior of bricks to keep pieces from falling away if for any reason the brick is broken. Even further, by designing the thickness of the metal net to varying dimension, the net can be used as the interior structure for the other construction materials mentioned above. For example, a tile can be made by first producing an expanded metal net having the general thickness and shape of the tile to be made, filling the cells or eyes of the net with the clay, perlite, or other tile forming material, finishing the surfaces and edges, and then curing to complete the product. The same procedure can be used for wall boards and even thicker products such as construction briquettes made of perlite. Keeping in mind that the thickness and other dimensions of the expanded metal net can be controlled not only by adjusting the distance between lines of slits but also the extent to which the metal is stretched when it is pulled, the construction materials such as tiles, wallboards, bricks, etc. can be made in any desired shape or dimension. A special feature of construction materials produced in this manner is that the presence of the non-flammable metal net on the interior of the product prevents the spread of fires by keeping fire from passing through the net, as described in greater detail hereinbefore. Thus the construction materials of the present invention are improved not only from the standpoint of strength and elasticity, but also provide a previously unavailable feature—namely, fireproofing.

In the field of decorative arts, the metal nets of the present invention provide a number of useful innovations. Thus, when magnesium alloys are used as the raw material, and especially when combined with alkaline bichromate, the resulting net is an active, conductive, anticorrosive, rust-repellant, bright, easy to process, and formable material. For example, because it is bright, polychrome and stainless, the expanded net can be used as a flame-retaining decorative screen in front of fireplaces and stoves, as well as a decoration for windows. As a further example, if colored foils 0,03–0.08 mm thick are slitted and opened slightly to make matlike nets, they can be covered with single or double coats of facing materials and shaped as bracelets to be worn on the human body as jewelry to reduce static electricity.

Although preferred embodiments of the invention have been described herein in detail, it will be understood by those skilled in the art that variations may be made thereto without departing from the spirit of the invention.

What is claimed is:

1. An article having a specific internal surface area of at least about 250 $ft.^2$ per $ft.^3$ and a porosity of at least 80% and possessing effective flame arresting, explosion suppression and mechanical impact protection properties, comprising a body of multiple components of expanded metal net formed by stretching slitted sheets of material, said material characterized in having a thickness in the range of about 0.028 to 1.0 mm and having discontinuous slits in parallel lines which are spaced apart from about 1 to 4 mm, the length of said slits being in the range between about 1 and 2.5 cm, and the length of the gaps between slits being in the range of between about 2 to 6 mm.

2. An article as in claim 1 wherein the specific internal surface area is about 300 to 325 $ft.^2$ per $ft.^3$

3. An article as in claim 1 wherein the porosity of said article is in the range of from about 80 to 99%.

4. An article as in claim 1 wherein said sheets of material are a metal foil.

5. An article as in claim 1 wherein said metal is aluminum or aluminum alloy.

6. An article as in claim 1 wherein said metal is a magnesium alloy.

* * * * *